C. Wheeler Jr.
Harvester Rake.
№ 79881 Patented Jul 14, 1868
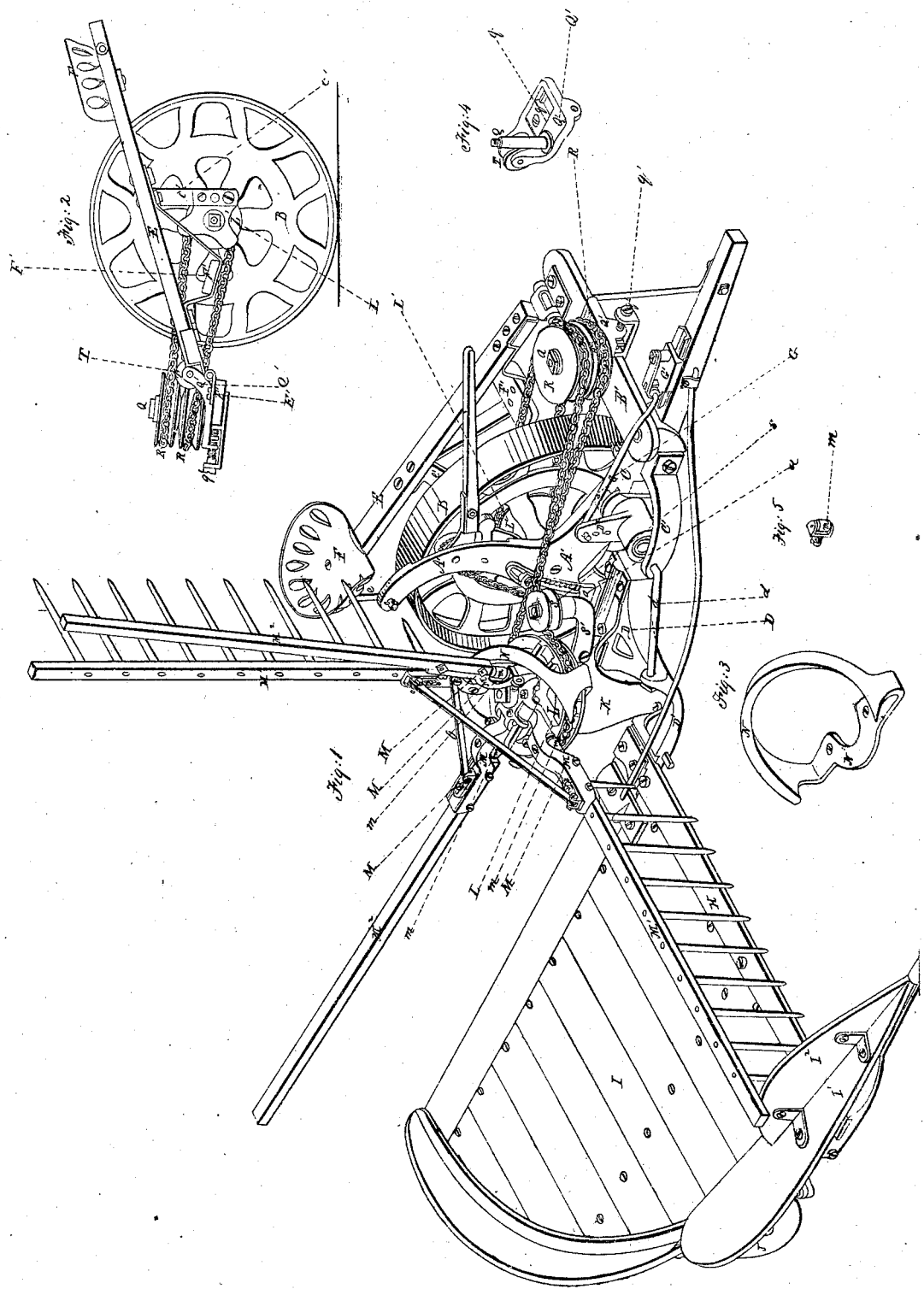

United States Patent Office.

CYRENUS WHEELER, JR., OF AUBURN, NEW YORK.

Letters Patent No. 79,881, dated July 14, 1868.

IMPROVEMENT IN HARVESTER-RAKES.

*The Schedule referred to in these Letters Patent and making part of the same.*

TO ALL WHOM IT MAY CONCERN:

Be it known that I, CYRENUS WHEELER, Jr., of Auburn, Cayuga county, State of New York, have invented certain new and useful Improvements in Harvester-Rakes; and I do hereby declare the following to be a full, clear, and exact description of the same, reference being had to the accompanying drawing, making a part of this specification, in which—

Figure 1 is a perspective view of a harvesting-machine, embracing my improvements.

Figure 2 is a side elevation, showing the arrangement of the adjustable rake, chain-pulleys, driver's seat, &c.

Figure 3 is a perspective view of the cam detached, and

Figure 4 is a similar view of the adjustable pulley-shaft.

Similar letters of reference denote corresponding parts in all the figures.

The invention relates to certain improvements in the means for regulating the movements of the revolving rake and reel-arms, and in the arrangement of mechanism for driving the same, and will be understood from the following description.

For the purpose of illustrating my improvements, and the manner of applying them in practice, I have shown in the drawings a harvesting-machine of the class known as a combined machine; that is to say, one having such a construction as to adapt it to be used either for reaping or mowing by simply changing some of its parts, or by the removal or addition of such parts in a manner well known to those familiar with their use. In the present instance the machine is composed of three frames, viz, a main frame, A, to which the drive-wheel axle and drive-wheel B are attached; a tongue or draught-frame, C, and a crank or cutter-frame, D. The main or drive-wheel frame A is provided, on the side opposite the drive-wheel axle, with a cylindrical arm or projection, in which the tube-box for the pinion and bevel-wheel shaft is mounted, and to which the tongue and crank-frames are connected by sleeves embracing or surrounding said cylindrical arm, and forming a hinge-connection of said tongue and crank-frames with the main frame, in such manner that while the drive-wheel axle forms the fulcrum upon which the adjustment of the several frames is effected, the bevel-wheel shaft forms the centre around which the said frames move when adjusted for varying their angle of relation to each other. The main frame A is provided with an arm, A', extending to the rear of the axle, and above the drive-wheel, and affording a support for the ratchet-wheel, pulley, and lever, through which, by means of a cord or chain, the height of the crank-frame is adjusted. Said arm A' also serves as a point of attachment for the rear brace $e$ to the seat-bar or support E, the forward end of which is hinged to a bar or plate, E', bolted to the tongue-frame. The seat-bar or support is further braced or sustained by an adjustable leg or arm, connected to a washer or plate on the axle, outside of the drive-wheel, and is provided with a seat, F, and foot-board F' for the driver.

The rear dropping end of the crank-frame D terminates in a shoe, D¹, to which the finger-bar and platform are connected in any suitable or desired manner. A brace, $d$, attached to the shoe, extends forward, and is pivoted to an arm of the tongue-frame at a point in line with the bevel-wheel shaft. G is a draught-rod, connected at its rear end to an upright, D², on the sleeve of the crank-frame which connects said frame with the main frame. The draught-rod G is connected at its forward end to a sliding box or plate on the tongue or tongue-frame, to which the draught of the team is applied in such manner as to relieve the drag of the crank-frame and shoe upon the ground. The upright, D², is perforated at various points in its length, to admit of adjusting the draught-rod for varying the leverage of said upright, and consequently the power or effect of the draught upon the crank-frame, as desired. H is the finger-bar, and I the platform, supported at their inner end by the shoe D¹, and at their outer end by a carrying-wheel, J. The outer edge of the platform has a rim or guard applied to it, which conforms to the path of the outer ends of the reel-beaters and rake-heads in sweeping over the platform, and which serves to properly direct the grain in its removal from the platform, as hereinafter described.

K is a rake-standard, attached to the crank-frame, and provided at its upper end with a fixed shaft or stud, on which the revolving head to which the rake and reel-arms are hinged, is mounted and turns, said head, in this instance, consisting of a horizontal chain-sheave or sprocket-wheel, L, the upper face of which is recessed or flanged, to receive the rake and reel-arms M pivoted thereto, as shown in fig. 1.

The arms M are chambered on their under faces, to receive stands armed with small friction-rollers $m$, (see fig. 5,) which traverse the face of the guiding-cam N as the rake and reel-arms revolve. The form of the guiding-cam or track N, which serves to give the necessary rising and falling movements to the rake-arms and reel-beaters in their revolution, is represented in fig. 3, said cam or track being formed or cast in one piece, with a base-plate or yoke, N', and firmly bolted to the top of the rake-standard K, in such manner as to embrace or surround the chain-sheave L. The rake and reel-arms M are connected together in pairs by means of links O and plates $o$, attached to said arms, and made adjustable thereon by means of slots and set-screws, in such manner that, by adjusting the plates $o$ in or out upon the arms, the angle of relation of said arms to each other, and consequently the path described by them in their revolution, may be varied as desired.

The rake-heads and reel-beaters are attached to the outer ends of the arms M in any usual manner, and are made of sufficient length to reach the point $i$ of the divider $I^1$ in reeling in the grain to the cutters. A ridge-board or inclined track, $I^2$, serves to raise the outer end of the rake-heads, and to prevent the rake-teeth from being caught in the cutters when loaded down by fallen or tangled grain. The rake and reel-arms are further provided with lugs or ears near their pivoted ends, armed with set-screws, which rest upon the face of the sheave or rotating head L, and which serve by their adjustment to regulate the angle of relation of the rake-heads and beaters to the platform while passing over the same. L' is a sheave or sprocket-wheel, connected with the hub of the drive-wheel, on the outer side of said wheel, from which motion is communicated to the rotating head or sheave L, on the inner side of the drive-wheel, by means of an endless chain passing around horizontal pulleys R R, mounted on an adjustable vertical shaft, Q, in front of the drive-wheel, as represented in fig. 1. A small pulley or sheave, S, on an arm, S', bolted to the rake-stand, serves to properly direct the chain in passing over the rotating head or sheave L. The vertical pulley-shaft Q is attached to a slotted plate Q', secured to the bar E' by a grooved or rebated guide-block, $q$, so that it may be adjusted back and forth by a set-screw, $q'$, or other equivalent device for regulating the tension of the rake-driving cord or chain.

A vertical pulley, T, mounted in arms of plate Q', serves to guide the chain in passing to and from the pulley R.

The frame A has attached to it an adjustable stop, $a$, which serves to regulate the upward movement of the crank-frame, the height of which frame is adjusted by means of the lever and pulley on the main frame, as described. The driving-pulley or sprocket-wheel L' may be connected with the hub of the drive-wheel by a backing-ratchet or clutch, if desired, in such manner as to remain stationary when the machine is backed.

The operation of the several parts will be readily understood from the foregoing description of their construction and arrangement.

Having now described my improvements, what I claim, and wish to secure by Letters Patent, is—

1. The construction and arrangement of the chain-sheave or pulley, whereby it is adapted to serve as the rotating head to which the rake and reel-arms are pivoted.

2. The arrangement of the endless chain and the driving and guide-pulleys, for driving the rake, arranged on one side of the drive-wheel, from a pulley or sheave on the opposite side of said wheel, substantially as described.

3. The rake-cam or track, made in one piece with the base-plate or yoke, and attached to the rake-stand, substantially as described.

4. Mounting the friction-rollers that traverse the guiding-cam in detachable boxes or stands, located in recesses or chambers formed in the rake and reel-arms.

5. Linking the rake and reel-arms together in pairs, in such manner that the angle of relation of said arms may be varied by adjusting the point of connection of the links therewith at either end.

6. The rake and reel-arms provided with lugs or ears, having set-screws for adjusting the height of said arms in passing over the platform.

7. The guiding-sheave or pulleys in front of the drive-wheel, around which the rake-driving chain passes, made adjustable for the purpose set forth.

8. The main frame, or arm A' thereof, extended in rear of the drive-wheel, and affording a point of support for the seat-bar, substantially as described.

C. WHEELER, JR.

Witnesses:
HORACE T. COOK,
CHARLES B. WHEELER.